United States Patent [19]
Jakobsson et al.

[11] Patent Number: 6,157,920
[45] Date of Patent: Dec. 5, 2000

[54] EXECUTABLE DIGITAL CASH FOR ELECTRONIC COMMERCE

[75] Inventors: Bjorn Markus Jakobsson, Hoboken, N.J.; Ari Juels, Cambridge, Mass.

[73] Assignees: Lucent Technologies Inc., Murray Hill, N.J.; RSA Security Inc., Bedford, Mass.

[21] Appl. No.: 09/134,012

[22] Filed: Aug. 14, 1998

Related U.S. Application Data

[60] Provisional application No. 60/066,143, Nov. 19, 1997.

[51] Int. Cl.⁷ ........................................ G06F 17/60
[52] U.S. Cl. ........................ 705/69; 705/64; 705/65; 705/67; 705/74; 705/76; 705/80
[58] Field of Search .................. 705/37, 69; 235/380

[56] References Cited

U.S. PATENT DOCUMENTS

| | | |
|---|---|---|
| 5,453,601 | 9/1995 | Rosen . |
| 5,455,407 | 10/1995 | Rosen ..................................... 235/380 |
| 5,689,652 | 11/1997 | Lupien et al. ............................ 705/37 |
| 5,727,165 | 3/1998 | Ordish et al. ............................ 705/37 |
| 5,787,402 | 7/1998 | Potter et al. ............................. 705/37 |
| 5,855,008 | 12/1998 | Goldhaber et al. ....................... 705/14 |
| 5,905,975 | 5/1999 | Ausubel .................................. 705/37 |
| 6,026,375 | 2/2000 | Hall et al. ................................ 705/26 |

FOREIGN PATENT DOCUMENTS

| | | | |
|---|---|---|---|
| 0 895 173 | 2/1999 | European Pat. Off. ........ | G06F 17/60 |
| WO 97/22074 | 6/1997 | WIPO ............................ | G06F 17/60 |

OTHER PUBLICATIONS

General Magic Lets Agents Loose on the Internet, Computergram International, n941, pCGN06250002, Jun. 25, 1996, ISSN: 0268–716X.

D. Chaum, A. Fiat and M. Naor, "Untraceable Electronic Cash," Advances in Cryptology—Proceedings of Crypto '88, pp. 319–327.

S. Brands, "Untraceable Off–line Cash in Wallets with Observers," Advances in Cryptology—Proceedings of Crypto '93, pp. 302–318.

T. Okamoto, "An Efficient Divisible Electronic Cash Scheme," Advances in Cryptology—Proceedings of Crypto '95, pp. 438–451.

R. Rivest and A. Shamir, "PayWord and MicroMint: Two Simple Micropayment Schemes," Cryptobytes, vol. 2, No. 1, 1996, pp. 7–11.

(List continued on next page.)

*Primary Examiner*—James P. Trammell
*Assistant Examiner*—Chang Y. Chung
*Attorney, Agent, or Firm*—Ryan & Mason, L.L.P.

[57] ABSTRACT

The invention provides techniques for implementing secure transactions using an instrument referred to as "executable digital cash." In an illustrative embodiment, a first user generates a piece of digital cash representing an offer made by that user. The piece of digital cash includes a digital certificate authorizing the first user to make specified transfers, and an offer program characterizing the offer. The piece of digital cash is broadcast or otherwise transmitted to one or more additional users, utilizing a mobile agent or other suitable mechanism, such that a given one of these users can evaluate the offer using the offer program. For example, a second user could execute the offer program with a specific bid as an input to determine what that user would receive upon acceptance of his bid. If the result is acceptable to the second user, that user generates a bid capsule including the bid, the corresponding output of the offer program, and another certificate authorizing the second user to make the transfer specified in the bid. The bid capsule is submitted to an institution for processing in accordance with a policy which may be specified in the piece of digital cash. The institution selects one or more winning bids and implements the corresponding transactions. Digital signatures generated using secret keys associated with the certificates of the first and second users are utilized to ensure adequate security for the transmitted offer and bid information.

28 Claims, 4 Drawing Sheets

OTHER PUBLICATIONS

D. Chaum and T. Pedersen, "Wallet databases with observers," Advances in Cryptology—Proceedings of Crypto '92, pp. 89–105.

A. Juels, M. Luby and R. Ostrovsky, "Security of Blind Digital Signatures," Advances in Cryptology—Proceedings of Crypto '97, pp. 150–164.

M. Jakobsson, "Ripping Coins for a Fair Exchange," Advances in Cryptology—Proceedings of Eurocrypt '95, pp. 220–230.

S. Jarecki and A. Odlyzko, "An Efficient Micropayment System Based on Probabilistic Polling," Advances in Cryptology—Proceedings of Financial Cryptography '97, pp. 173–191.

M. Jakobsson and M. Yung, "Applying Anti–Trust Policies to Increase Trust in a Versatile E–Money System," Advances in Cryptology—Proceedings of Financial Cryptography '97, pp. 217–238.

D. Rus, R. Gray and D. Kotz, "Transportable Information Agents," 1st Intl. Conf. Autonomous Agents, 1997.

B. Venners, "Solve Real Problems with Aglets, a Type of Mobile Agent," Javaworld, May 1997.

M. Jakobsson and M. Yung, "Revokable and Versatile Electronic Money," 3rd ACM Conference on Computer and Communications Security, 1996, pp. 76–87.

E. Brickell, P. Gemmell and D. Kravitz, I. "Trustee–based Tracing Extensions to Anonymous Cash and the Making of Anonymous Change," (SODA '95), pp. 1–10.

J. Camenisch, J.–M. Piveteau and M. Stadler, "An Efficient Fair Payment System," Proceedings of the 3rd ACM Conference on Computer and Communications Security, 1996, pp. 88–94.

J. Camenisch, U. Maurer and M. Stadler, "Digital Payment Systems with Passive Anonymity–Revoking Trustees," 11 pp.

G. Davida, Y. Frankel, Y. Tsiounis and M. Yung, "Anonymity Control in E–Cash Systems," Feb. 17, 1997, pp. 1–15.

B.M. Jakobsson, "Privacy vs. Authenticity," Dissertation submitted in partial satisfaction of the requirements for the degree Ph.D. in Computer Science, 1997, pp. 1–54.

M. Jakobsson, K. Sako and R. Impagliazzo, "Designated Verifer Proofs and Their Applications," 12 pp.

C. G. Harrison, D.M. Chess and A. Kershenbaum, "Mobile Agents: Are they a good idea?," Research Report, IBM Research Division, Yorktown Heights, NY, pp. 1–24, Mar. 1995.

B. Venners, "Under the Hood: The architecture of aglets," Javaworld, Apr. 1997, 7 pp.

EXECUTABLE DIGITAL CASH FOR ELECTRONIC COMMERCE

RELATED APPLICATION

The present application claims the benefit of U.S. Provisional Application No. 60/066,143 filed Nov. 19, 1997 and entitled "Executable Digital Cash."

FIELD OF THE INVENTION

The invention relates generally to electronic transactions carried out over computer networks and other types of communication media, and more particularly to techniques for ensuring security for such transactions.

BACKGROUND OF THE INVENTION

The growth of the Internet and the increasing sophistication and availability of cryptographic tools have led to the widespread implementation of numerous electronic commerce applications, including on-line shopping, banking and other activities, all of which may be broadly described as "trading." The improved efficiency of such electronic commerce applications is attributable to a number of factors, including minimized human involvement, improved distribution of goods and information, and more rapid processing of transactions. Ideally, prospective traders should be able to locate one another in a highly automated fashion and then execute trades with strong security guarantees.

Since the introduction of payment schemes to the field of cryptography by D. Chaum, A. Fiat and M. Naor, "Untraceable Electronic Cash," Advances in Cryptology—Proceedings of Crypto '88, pp. 319–327, subsequent developments have tended either to introduce new features into existing payment paradigms or to address stronger attack models. Among the new features recently introduced are off-line payments, as described in, e.g., S. Brands, "Untraceable Off-line Cash in Wallets with Observers," Advances in Cryptology—Proceedings of Crypto '93, pp. 302–318; divisibility, as described in, e.g., T. Okamoto, "An Efficient Divisible Electronic Cash Scheme," Advances in Cryptology—Proceedings of Crypto '95, pp. 438–451; and micro-payments, as described in, e.g., R. Rivest and A. Shamir, "PayWord and MicroMint: Two Simple Micropayment Schemes," Cryptobytes, Vol. 2, Num. 1, 1996, pp. 7–11.

Examples of stronger attack models or improved protection against attacks include tamper-resistance, as described in, e.g., D. Chaum and T. Pedersen, "Wallet databases with observers," Advances in Cryptology—Proceedings of Crypto '92, pp. 89–105; provable security against forgery, as described in, e.g., A. Juels, M. Luby and R. Ostrovsky, "Security of Blind Digital Signatures," Advances in Cryptology—Proceedings of Crypto '97, pp. 150–164; fairness, as described in, e.g., M. Jakobsson, "Ripping Coins for a Fair Exchange," Advances in Cryptology—Proceedings of Eurocrypt '95, pp. 220–230; probabilistic on-line verification, as described in, e.g., S. Jarecki and A. Odlyzko, "An Efficient Micropayment System Based on Probabilistic Polling," Advances in Cryptology—Proceedings of Financial Cryptography '97, pp. 173–191; and revocable anonymity, as described in, e.g., M. Jakobsson and M. Yung, "Applying Anti-Trust Policies to Increase Trust in a Versatile E-Money System," Advances in Cryptology—Proceedings of Financial Cryptography '97, pp. 217–238.

These and other conventional techniques, however, often assume that the trading process starts at a point where there are two parties who are aware of each other's existence and whereabouts and wish to perform a transfer of funds and merchandise. Although such an assumption may be appropriate for a conventional peer-to-peer commercial setting, it is not necessarily true for the type of settings which are common in electronic commerce, i.e., settings in which there are large numbers of uncoordinated and distributed participants potentially willing to engage in trades, but unaware of each other's trade goals. It is possible in such settings to let prospective trading partners seek each other out and then initiate peer-to-peer transactions. This, however, increases the risk of communication bottlenecks, since, e.g., communicating with the originator of an offer may require costly traversals of a network. In addition, if the originator of an offer receives many bids but has limited computational power, this type of commerce could overtax his or her computational resources.

A possible alternative method of establishing first contact between traders involves the use of "mobile agents," as described in, e.g., D. Rus, R. Gray and D. Kotz, "Transportable Information Agents," 1st Intl. Conf. Autonomous Agents, 1997. Mobile agents may be viewed as program segments which are sent across a network and execute on host machines. Their aim is to perform some task on behalf of a corresponding user with a certain degree of autonomy. Proposed uses include bartering, negotiating, entertainment, monitoring, data selection and filtration, searching, and distributed processing. However, the conventional payment schemes noted above are generally not well adapted for use with mobile agents. For example, if a mobile agent carries conventional digital cash, it may be vulnerable to "pick-pocketing," as described in, e.g., B. Venners, "Solve Real Problems with Aglets, a Type of Mobile Agent," Javaworld, May 1997. On the other hand, not allowing mobile agents to carry fluids to perform commerce requires a reduction to the peer-to-peer setting with its attendant bottlenecks.

Another technique which has been proposed for use in electronic commerce applications is known as "challenge semantics" and is described in M. Jakobsson and M. Yung, "Revokable and Versatile Electronic Money," 3rd ACM Conference on Computer and Communications Security, 1996, pp. 76–87. This technique uses the challenge of a payment to indicate the conditions of the trade. However, it generally only allows a designation of the payment to be specified, and fails to provide an adequate solution to the above-noted problem of agent-based trade.

SUMMARY OF THE INVENTION

The present invention provides an efficient and practical payment technique which may be based upon any type of transmission mechanism, including mobile agents, and which overcomes the problems of the prior art. The invention may be implemented in the form of an instrument referred to herein as "executable digital cash," or X-cash. X-cash allows an offer to be bound to the corresponding rights to be transferred, thereby enabling the processes of bid searching and payment to be unified. The result is a mechanism by which electronic trades can occur in a highly distributed setting with strong security guarantees. When a party receives an X-cash offer, he or she can verify that it is bona fide and can initiate a trade immediately, without contacting the originator directly. The invention thereby avoids the communication bottlenecks often associated with conventional techniques.

In an illustrative embodiment, a first user generates a piece of digital cash representing an offer made by that user.

The piece of digital cash includes a digital certificate authorizing the first user to make specified transfers, and an offer program characterizing the offer. For example, the offer program may be configured to take as an input information regarding an item, and to output information regarding what the first user is willing to give for the item as part of the offer. The piece of digital cash also generally includes a digital signature on the offer program, generated using a secret key associated with the certificate, and may include other instructions and/or data, such as a policy field specifying the manner in which multiple bids should be processed by the first user's financial institution.

The piece of digital cash is broadcast or otherwise transmitted to one or more additional users, utilizing a mobile agent or other suitable mechanism, such that a given one of these users can evaluate the offer using the offer program. For example, a second user could execute the offer program with a specific bid as an input to determine what that user would receive upon acceptance of his bid. If the result is acceptable to the second user, that user generates a bid capsule including the bid, the corresponding output of the offer program, a second certificate authorizing the second user to make the transfer specified in the bid, and a digital signature on the bid and output using a secret key associated with the second certificate. The bid capsule is submitted to the financial institution of the first user for processing in accordance with the policy specified in the piece of digital cash. The financial institution uses the specified policy to select one or more winning bids and implements the corresponding transactions.

An example of the operation of the invention is as follows. A first user, referred to as Alice, obtains from her financial institution a signed certificate bearing her public key $PK_A$ and authorizing her to make payments using a corresponding secret key $SK_A$. Alice signs an offer program $\omega$ using the secret key $SK_A$. This offer program $\omega$ takes as input some item, e.g., another program, a news article, or frequent flier miles, and outputs the amount which Alice is willing to pay for that item. The offer program $\omega$ along with the certificate constitute a piece of X-cash, i.e., an X-cash coin. If a second user, e.g., a user Bob, wishes to sell an item Q to Alice, he can take the X-cash and the item Q to Alice's bank. By executing the offer program $\omega$ on Q, Alice's financial institution can determine how much to pay Bob. Alice's financial institution may then hold the item Q for Alice or otherwise arrange to send it to her. The trade is thus completed in a secure fashion without any direct contact between Alice and Bob. Alternatively, Bob can submit a bid Q by executing the offer program $\omega$ on the bid Q, signing the result using a secret key associated with a certificate authorizing Bob to make the transfer specified in the bid, and submitting this information in a bid capsule to Alice's financial institution for processing. Alice's financial institution processes the received bid, and executes the corresponding transaction if policy criteria specified in the X-cash coin are satisfied by the bid.

The invention can be applied to a wide variety of different types of payment schemes, including payment schemes with revocable anonymity controlled by a set of trustees, certificate-based payment schemes without anonymity, and payment schemes with on-line redemption. The invention can provide the properties of entitlement authentication, fairness, perfect matchmaking and integrity. Moreover, a given piece of X-cash is compact, and permits offers and bids to be processed efficiently.

DETAILED DESCRIPTION OF THE INVENTION

Figure 1:
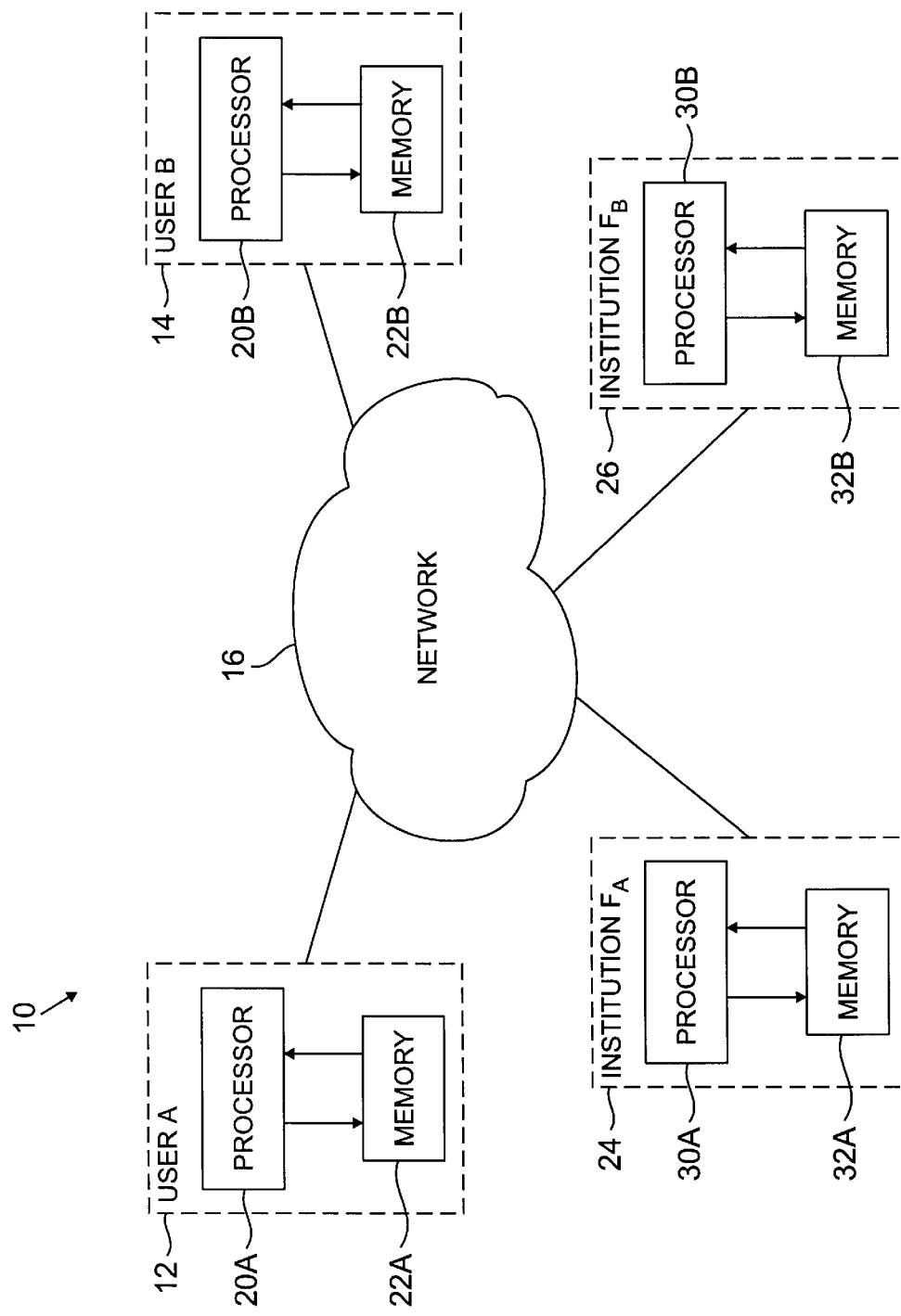
FIG. 1 shows an exemplary system in which executable digital cash in accordance with the invention may be generated and utilized.

The present invention will be illustrated below in conjunction with an exemplary system using automated trading over the Internet or other type of communication network. It should be understood, however, that the invention is more generally applicable to any type of electronic commerce application in which it is desirable to provide security without one or more of the problems associated with conventional techniques. Although particularly well-suited for use wild communications over the Internet or other computer networks, the invention can also be applied to numerous other secure transaction applications, including applications based on smart cards or other electronic devices. The terms "piece of digital cash" or "X-cash coin" as used herein are intended to include any electronic representation of value, such as, for example, electronic representations of cash, credit lines, stock certificates, frequent flier miles, passports or any other type of currency, credential or other item of value. A "transfer" refers generally to a process in which an individual, institution or other type of user assigns rights in any such item of value to another. The term "institution" is intended to include a bank, credit card company, credit agency or other financial institution, as well as any other entity or organization which can provide an indication as to availability of resources for a particular user. The term "offer program" as used herein is intended to include computer-readable code or any other type of program or other mechanism for conveying information regarding an offer. In a given embodiment, an offer program may correspond to a suitable representation of an offer function or an offer function itself, or any other mechanism for characterizing an offer. The term "digital certificate" is intended to include not only negotiable certificates as defined herein, but more generally any mechanism by which an institution authorizes a user to make a transfer.

The present invention in an illustrative embodiment provides an instrument referred to herein as "executable digital cash," or "X-cash." X-cash may be viewed as a technique for binding an offer to the corresponding rights to be transferred, such that electronic trades can occur in a highly distributed setting with strong security guarantees. When a user receives an X-cash offer, he or she can verify that it is bona fide and can initiate a trade immediately, without contacting the originator directly. X-cash may therefore be used, among other things, to enable mobile agents to carry funds and make payments on-site without running the risk of "pickpocketing" inherent in conventional electronic cash.

Definitions

An "offer" as the term is used herein refers generally to a proposal to trade some collection of goods, moneys, services or other rights for another collection of goods, moneys, services or other rights according to a set of terms. An offer may, e.g., involve either buying or selling, or a combination of both buying and selling. A user Alice might, for instance, make an offer to sell 500 French francs at 5 francs per $1, or she might make an offer to buy up to 500 French francs at $1 per 5 francs. A "bid" is a response to an offer. If Alice is selling French francs, and another user Bob tenders her $5, then Bob is making a bid. Any entity making an offer or a bid is referred to as a "trader." These ideas can be described more formally in terms of an offer function, defined as a function $\omega: S \rightarrow T$. Here $S=\{0,1\}^*$ is the space of possible bids and $T=\{0,1\}^* \cup \phi$ is the space of possible goods, moneys, or services proposed in response to these bids. The symbol $\phi$ indicates a null response, i.e., the bid is deemed unacceptable. The symbol $\omega$ will be used interchangeably to indicate an offer function and an offer program implementing an offer function. We denote by $\omega(Q)$ the output of offer function $\omega$ on a bid $Q$. Note that the offer function $\omega$ in this illustrative embodiment is stateless. It does not compute, for example, based on the current time or on a history of bids. In other embodiments, the offer function may be made stateful by, e.g., defining S to include parameters such as the current time and a list of all bids made in response to an offer. An X-cash "coin" $\Omega$ is defined as an expression of an offer function $\omega$, e.g., as a program or a text description, or in any other form, along with all accompanying signatures, certificates, programs, and instructions. Alice will broadcast or otherwise transmit $\Omega$, e.g., via a mobile agent, an e-mail message or a posting to an on-line bulletin board, in order to initiate a trade.

The illustrative embodiment of the invention will also make use of what are referred to herein as "negotiable certificates." A negotiable certificate is an authorization, issued by an institution, for a trader to make offers using some quantity of assets held by the institution. For example, let $(SK_A, PK_A)$ denote a secret/public signature key pair held by a trader Alice, and let $(SK_F, PK_F)$ denote a secret/public signature key pair held by Alice's financial institution. A negotiable certificate C may be of the form $\sigma_{SK_F}(PK_A)$, where $\sigma_{SK_F}$ denotes a signature using the secret key $SK_F$. Note that the units of value of the certificate may either be left implicit, or may be specified in a designated field. For example, if Alice wishes to sign over a quantity m of assets to Bob, she may create the signature $\sigma_{SK_A}(Bob, m)$, and give it to Bob along with the negotiable certificate C to be redeemed by her financial institution. Thus a negotiable certificate may be viewed in the illustrative embodiment as, e.g., a license to write checks up to a certain amount. A negotiable certificate is one example of what is more generally referred to herein as a digital certificate.

Exemplary System

FIG. 1 shows an exemplary system 10 in which X-cash electronic transactions may be implemented in accordance with the invention. The system 10 includes a first user 12 and a second user 14, both connected to a network 16. The first and second users 12, 14 are also referred to herein as user A and user B, respectively, or by the names Alice and Bob, respectively. It should be noted in this context that the term "user" may refer either to the physical devices, e.g., a computer and other hardware, associated with a given human user, to the actual human user of those devices, or to both. The users 12, 14 include processors 20A, 20B coupled to memories 22A, 22B, respectively. Financial institutions $F_A$ and $F_B$ associated with users 12 and 14, respectively, are also coupled to the network 16, and similarly include processors 30A, 30B coupled to memories 32A, 32B, respectively. It should be noted that financial institutions $F_A$ and $F_B$ may be the same institution, different parts of the same institution, or different institutions. In addition, an entity acting as an institution in a given transaction may act as a user in other transactions. The term "user" is therefore intended to include institutions.

One or more of the users 12, 14 and financial institutions 24, 26 may be implemented as a personal computer, a mainframe computer, a computer workstation, a smart card in conjunction with a card reader, or any other type of digital data processor as well as various portions or combinations thereof. The processors 20A, 20B, 30A and 30B may each represent a microprocessor, a central processing unit, an application-specific integrated circuit (ASIC) or other suitable processing circuitry. The memories 22A, 22B, 32A and 32B may be electronic, magnetic or optical memories, as well as portions or combinations of these and other types of memories. The network 16 may be a local area network, a metropolitan area network, a wide area network, a global data communications network such as the Internet, a private "intranet" network or any other suitable data communication medium. The users 12, 14 and financial institutions 24, 26 execute software programs in accordance with the invention in order to provide secure electronic transactions in a manner to be described in conjunction with FIGS. 2 through 5 below. The invention may be embodied in one or more software programs stored in one or more of the memories 22A, 22B, 32A or 32B, or in one or more programs stored on other computer-readable media.

Assumptions in the Illustrative Embodiment

In the exemplary system of FIG. 1, user A, also referred to herein as Alice, may broadcast her X-cash coin over network 16 by means, e.g., of a mobile agent. We assume the following about the network 16 in describing the illustrative embodiment:

1. An adversary may inject X-cash coins of her own construction into the network, such as a coin $\Omega'$ purporting to come from Alice.

2. The X-cash coin $\Omega$ may be freely read and executed by any party.

3. An adversary cannot significantly impede normal delivery of an X-cash coin. In particular, let D denote the total set of delivery points potentially reachable by an X-cash coin $\Omega$. Let $p_t(D)$ be the probability that $\Omega$ reaches a delivery point $D \in D$ after broadcast in a non-adversarial network in time t. Let $p_t^1(D)$ be the probability that $\Omega$ reaches delivery point D in time t in a setting where at least a constant c-fraction of network servers are honest, but the rest may refuse to deliver any message. Suppose that t is such that $p_t(D) > (1-\epsilon) \lim_{t \rightarrow \infty} p_t(D)$ for all $D \in D$ and for some constant $\epsilon$ such that $0 < \epsilon < 1$. In other words, t represents a long enough time for almost all of the broadcast to be accomplished under normal circumstances. We require in the illustrative embodiment that the probability distributions $p_t$ and $p_t^1$ be polynomial time indistinguishable over coin flips of the entities in the network.

4. All parties have unimpeded access to financial institutions.

We assume the following about the parties, i.e., the users and the financial institutions, in the illustrative embodiment:

1. Financial institutions may be trusted to act on behalf of their patrons, but not necessarily on behalf of other parties.

2. Financial institutions trust one another. Note that such an assumption is generally not necessary if we make use of a fair exchange protocol, such as that proposed in, e.g., N. Asokan and V. Shoup, "Optimistic fair exchange of digital signatures," Kaisa Nyberg, ed., Advances in Cryptology—EUROCRYPT '98, Lecture Notes in Computer Science, Springer-Verlag, Berlin, Germany, 1998, which is incorporated by reference herein.

3. Parties other than financial institutions are not necessarily trustworthy.

We make the following computational assumptions:

1. All parties have conventionally limited computational resources, e.g., polynomial in an appropriate security parameter.

2. A digital signature scheme is employed in which it is infeasible to forge signatures.

It should be noted that the above assumptions are intended to facilitate description of the illustrative embodiment of the invention, and should not be construed as limiting the invention in any way. Numerous alternative embodiments in which one or more of the foregoing assumptions do not apply will be apparent to those of ordinary skill in the art.

Exemplary X-cash Coin

Figure 2:
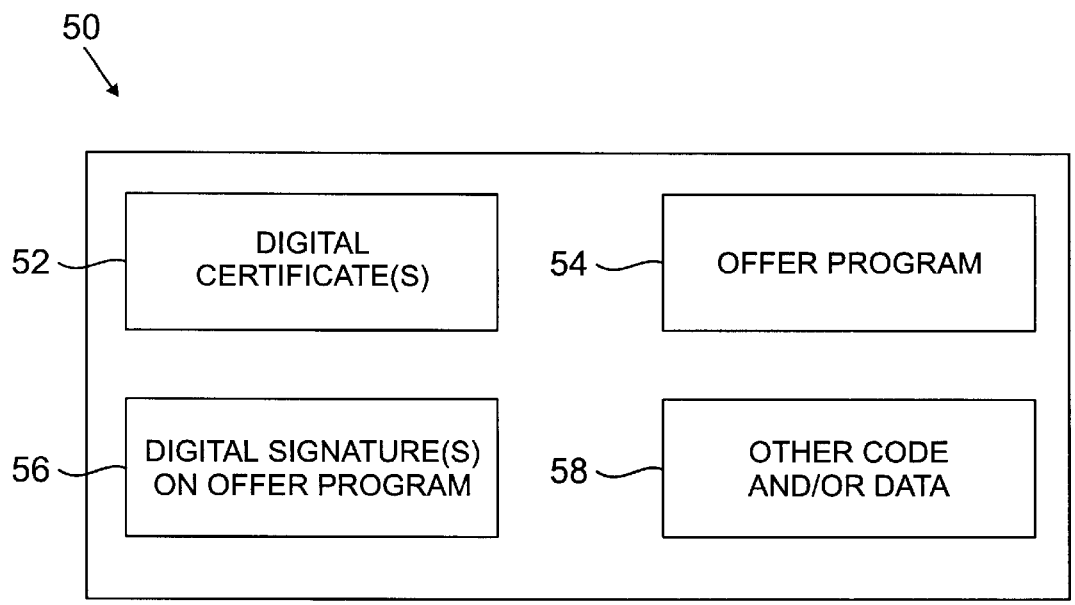
FIG. 2 illustrates an exemplary embodiment of executable digital cash in accordance with the invention.

FIG. 2 shows the general components of an X-cash coin 50 in accordance with the illustrative embodiment of the invention. The X-cash coin 50 represents one example of a piece of digital cash in accordance with the invention, and includes four components 52, 54, 56 and 58. The first component 52 is a set of one or more digital certificates C, each comprising, e.g., a digital signature on a public signature key. The second component 54 is a piece of executable offer code, i.e., the offer program $\omega$, which as previously described takes one or more pieces of input data and yields one or more pieces of output data. The third component 56 is a set of one or more signatures on the offer program $\omega$. The signatures are generated using secret keys corresponding to the public keys given in the certificates C in the first component 52. The fourth component 58 is a set of other code instructions and/or data for use by the recipient of the X-cash coin or by a financial institution responsible for processing the coin. The set of signatures in component 56 may optionally include signatures on elements from the fourth component 58 of the X-cash coin 50.

Protocols

Before presenting protocols in accordance with the illustrative embodiment, we will first describe the intuition underlying these protocols. Recall that before making an offer, a user Alice obtains a negotiable certificate C granting her access to the funds or other rights she wishes to offer, and enabling her to transfer those rights to another party. In accordance with the invention, Alice constructs her X-cash coin $\omega$ in such a way that the transfer of rights using C is conditional on having a suitable bid R as input to the offer program $\omega$. In other words, instead of directly signing over finds or other rights to an individual, Alice signs them over based on an offer program $\omega$ which evaluates the worth of a bid R.

To make a bid, Bob creates a suitable, signed representation R of his bid, and submits it to Alice's financial institution $F_A$ along with the X-cash coin $\Omega$. $F_A$ verifies that Alice's negotiable certificate C still retains sufficient value for the transaction with Bob, and may contact Bob's financial institution $F_B$ to ensure that Bob too has sufficient funds available. The two financial institutions $F_A$ and $F_B$ then process the exchange. Prior to making the bid, Bob may first verify that the transaction is wanted by Alice. For example, Alice may have already bought or sold the full amount she desired. The information communicated by Alice may include a counter or other mechanism specifying this. As another example, the X-cash coin $\Omega$ may include a field in which her transaction strategy is specified. The formal details of the protocols in the illustrative embodiment are described below in conjunction with the flow diagrams of FIGS. 3 through 5. Although not a requirement of the invention, all signatures may have full message recovery.

Figure 3:
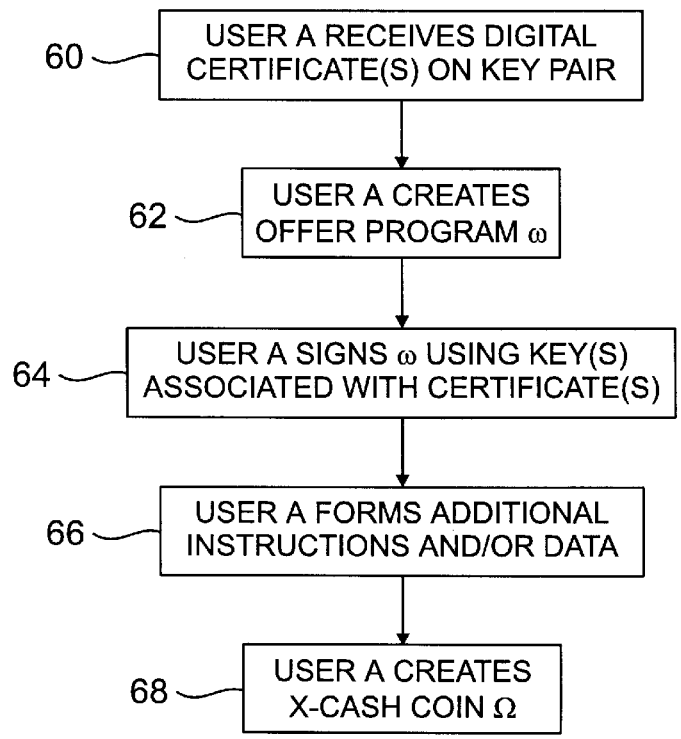
FIG. 3 is a flow diagram illustrating the generation of executable digital cash by a first user.

FIG. 3 is a flow diagram illustrating the creation of the X-cash coin 50 of FIG. 2 by a user also referred to as Alice. Alice in step 60 first obtains a set of one or more digital certificates C, i.e., component 52 of FIG. 2, from one or more issuing authorities, each certificate containing, e.g., a digital signature on a public key. For example, assume Alice has a negotiable certificate C from her financial institution $F_A$, attributing to her rights to all goods or moneys in T, the range of the offer function $\omega$ to be used in her X-cash coin $\Omega$. This certificate is issued against a public key $PK_A$ for which Alice holds the corresponding secret key $SK_A$. Alice decides what offer she wishes to make, and in step 62 constructs an offer function $\omega$: S→T. Again, S={0,1}* is the space of possible bids and T={0,1}* ∪$\phi$ is the space of possible responses to these bids. The offer function $\omega$ serves to express what finds, privileges, or other rights in Alice's possession she is willing to exchange or grant in return for funds, privileges, or other rights in possession of another party. As part of this process, Alice implements the offer function to in the form of a corresponding executable offer program $\omega$, i.e., component 54 of FIG. 2. As previously noted, the symbol $\omega$ will be used in the illustrative embodiment to designate both the offer function and its corresponding executable offer program.

In step 64, Alice signs the offer program $\omega$ using one or more secret keys associated with the digital certificates received in step 60, to generate component 56 of FIG. 2. Alice in step 66 then forms additional instructions and/or data, i.e., component 58 of FIG. 2. The additional instructions and/or data may include a policy field P which specifies the policy that Alice wishes to use in accepting bids. Such policies may include: (1) accepting all bids until all rights attributed by C are exhausted; (2) accepting the first j valid bids; or (3) accepting the best bid received before date d. Of course, many other policies could also be used. The additional instructions and/or data may also be signed using the secret key associated with the certificate. Alice in step 68 groups together the components forming the X-cash coin 50 as depicted in FIG. 2. The resulting X-cash coin is of the form $\Omega=[\sigma_{SKA}(\omega,P),C]$, where $\sigma_{SKA}(\omega,P)$ represents digital signatures on the offer program $\omega$ and the policy field P, respectively, using the secret key $SK_A$. The X-cash coin $\Omega$ may be broadcast or otherwise transmitted via a mobile agent or any other suitable mechanism.

Figure 4:
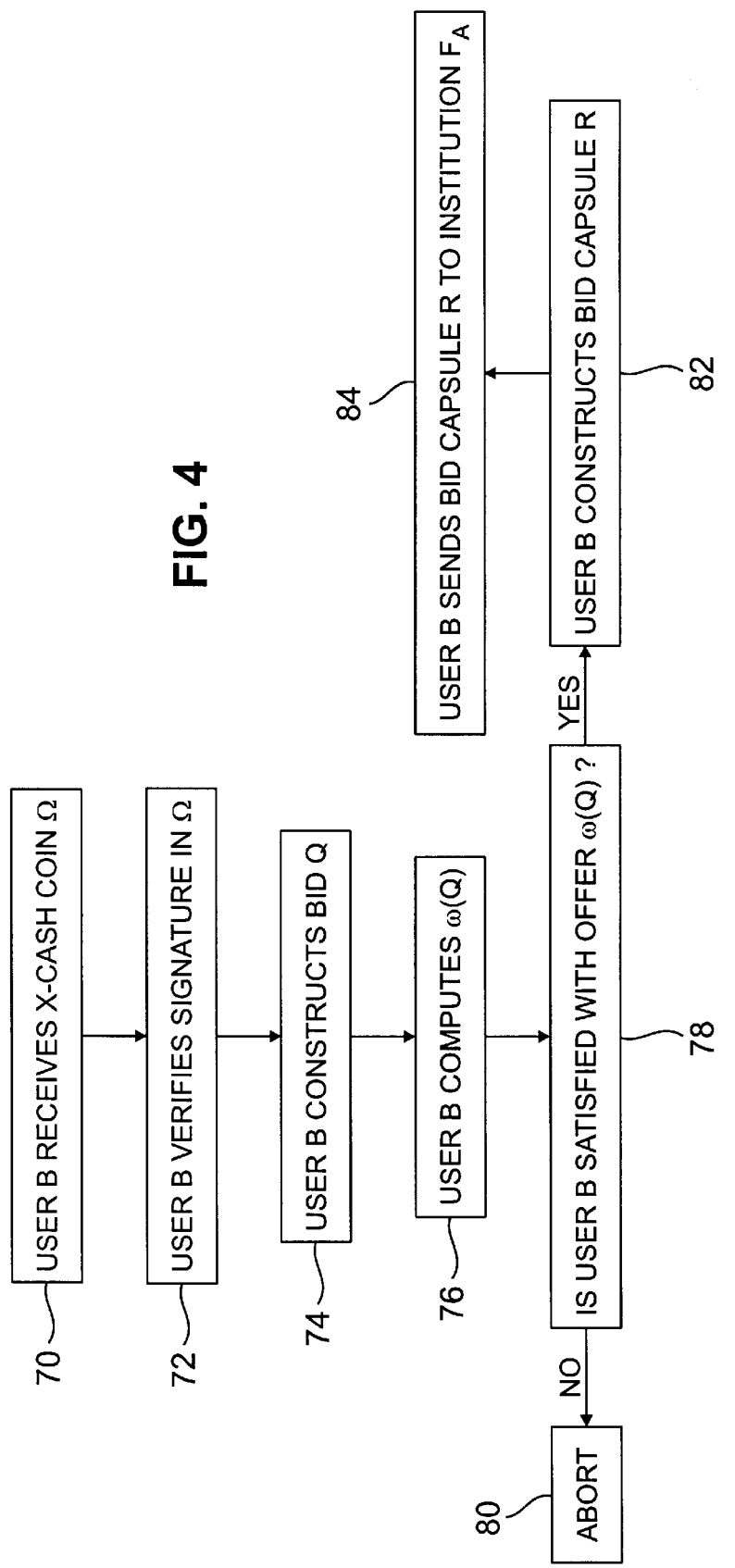
FIG. 4 is a flow diagram illustrating the use of executable digital cash by a second user.

FIG. 4 is a flow diagram showing use of the X-cash coin $\Omega$ by a user B, also referred to as Bob. After receiving Alice's X-cash coin $\Omega$ in step 70, Bob in step 72 verifies the correctness of the digital signatures $\sigma_{SKA}(\omega,P)$ using the public key $PK_A$. A preliminary evaluation of the offer could be done, either before or after the verification of signatures in step 72. For example, Bob may evaluate Alice's offer by reading, automatically processing or otherwise processing an attached textual description of the offer. The textual description describes what is offered such that Bob can determine whether to make a bid, and may be part of or otherwise associated with the offer program. For example, the textual description may read "have gold, want silver" such that if Bob has silver he may proceed to construct a bid, but if Bob has only some other asset, such as frequent flier miles, he will not waste his time generating a bid. Assuming that, based on the textual description, Bob determines that he would like to make a bid, Bob in step 74 constructs a bid Q to be made relative to Alice's offer. Bob then computes $\omega(Q)$ in step 76, where $\omega(Q)$ represents the output generated by executing the offer program $\omega$ with the input Q. The output $\omega(Q)$ thus represents an evaluation of the offer made in the X-cash coin $\Omega$ relative to the bid Q of Bob. In step 78, Bob decides whether or not he should accept the offer $\omega(Q)$. As part of this process, Bob verifies that the output indicates acceptance of the bid, i.e., that $\omega(Q) \neq \phi$. If he does not wish to accept the offer $\omega(Q)$, Bob in step 80 aborts the processing of the X-cash coin.

If Bob is satisfied with the offer and wishes to accept it, Bob in step 82 constructs a bid capsule R which includes Q and, optionally, a set of one or more certificates and digital signatures. For example, Bob may obtain from his financial institution $F_B$ a digital certificate C' bound to a public key $PK_B$ for which Bob holds the corresponding secret key $SK_B$. Note that Bob may have to perform this step earlier in the process if the offer program $\omega$ is constructed to check certificates of a bidder. The bid capsule created by Bob may be of the form $R=[\sigma_{SKB}(\Omega,Q,\omega(Q)),C']$. Note that the expected output $\omega(Q)$, i.e., the value $\omega(Q)$ that Bob computed in step 76, is included in the bid capsule R. This will avoid "bait-and-switch" attacks in which an offer appears one way when first evaluated by Bob, and in another way when redeemed by the financial institution $F_A$. In step 84, Bob sends the bid capsule R constructed in step 82 to $F_A$ for processing. It should be noted that the order of the various processing operations in FIG. 4 may be changed in alternative embodiments of the invention.

Figure 5:
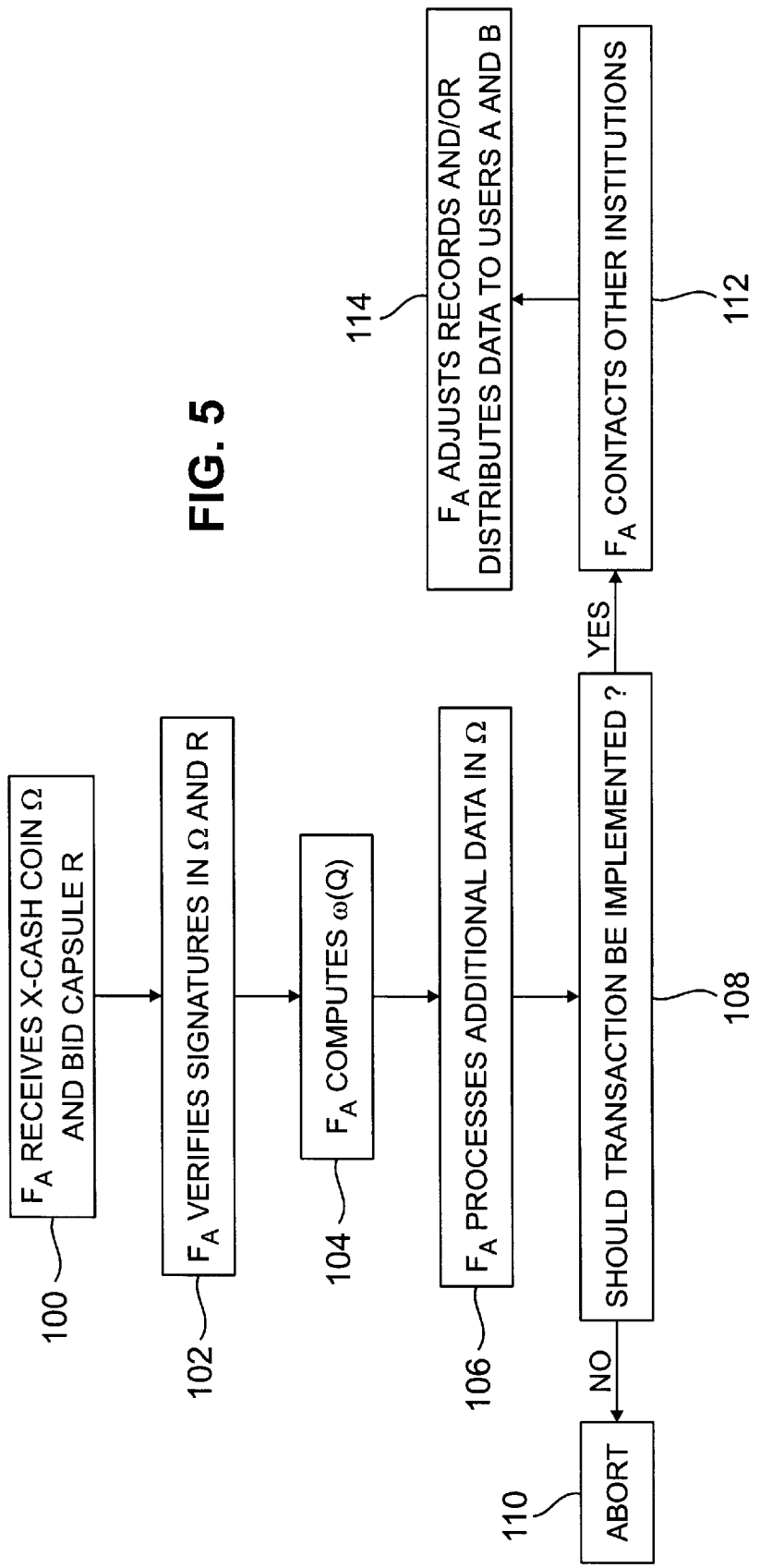
FIG. 5 is a flow diagram illustrating the processing of executable digital cash by an institution.

FIG. 5 is a flow diagram showing the processing of the X-cash coin and a particular bid capsule R by the financial institution $F_A$. After receiving the X-cash coin $\Omega$ and the bid capsule R instep 100, $F_A$ in step 102 verifies all of the digital signatures contained in $\Omega$ and R. $F_A$ then computes $\omega(Q)$ in step 104, and processes any additional instructions and/or data in the X-cash coin $\Omega$ in step 106. In step 108, $F_A$ determines whether the transaction should be implemented. If it is determined that the transaction should not be implemented, the transaction is aborted in step 110. Otherwise, $F_A$ may contact other financial institutions in step 112, e.g., $F_A$ may contact financial institution $F_B$ to ensure that Bob has sufficient funds to cover the bid. Assuming that Bob can cover the bid, $F_A$ completes the transaction, and then adjusts its records and/or distributes appropriate data or messages to Alice and Bob in step 114 indicating completion of the transaction. The contacting of other financial institutions in step 112 may alternatively be viewed as part of the determination in step 108 as to whether the transaction should be implemented. For example, $F_A$ may contact $F_B$ as part of step 108 to determine if Bob has sufficient funds to cover his bid. If $F_B$ indicates that Bob does not have sufficient funds, the transaction is aborted in step 110.

Step 106 for the first bid capsule received by $F_A$ on the X-cash coin $\Omega$ will generally involve $F_A$ reading the policy P in $\Omega$. This policy can then be stored by $F_A$ for use with all valid bid capsules $R_i = R_1, R_2, \ldots, R_m$ arriving for X-cash coin $\Omega$. For example, in accordance with the policy P in $\Omega$, the financial institution $F_A$ collects the valid bid capsules $R_1, R_2, \ldots, R_m$ (containing bids $Q_1, Q_2, \ldots, Q_m$). For each $R_i$ in $\{R_1, R_2, \ldots, R_m\}$, $F_A$ performs the following operations: (a) checks that $R_i$ is correctly formed, i.e., performs step 102 on $R_i$; (b) runs $\omega$ on the bid $Q_i$ contained in capsule $R_i$, i.e., performs step 104 on $R_i$; (c) if $\omega(Q_i) \neq \phi$, then $F_A$ checks that Alice has funds worth at least $\omega(Q_i)$ remaining against the negotiable certificate C, and if there are not sufficient funds, $F_A$ does not process $R_i$; and (d) checks with the appropriate financial institution $F_B$ that there are funds to back the bid $Q_i$, and if not, then $F_A$ does not process $R_i$. Operations (c) and (d) may be implemented using the alternative arrangement of steps 108–112 as previously described, or using other similar arrangements. If Alice has sufficient funds remaining to support a selected bid $Q_i$, then $F_A$ implements the transaction specified by offer and bid, as explained in greater detail below.

When financial institution $F_A$ has determined that it should implement a transaction as specified by $\Omega$ and some bid capsule $R_i$, the ownership rights need to be exchanged correspondingly. This can be done in a variety of ways. For example, if the same public key is to be used for the newly acquired rights, the financial institutions $F_A$ and $F_B$ could simply re-issue certificates on the public keys corresponding to the new owners of the rights. These certificates can then be forwarded by either financial institution to the acquirers, or "picked up" by the same. Alternatively, if a new public key is to be employed, the financial institutions may enter the old public keys of the parties acquiring the rights that they certify in a database, and the new owners have to supply a new public key to be certified, and prove knowledge of the secret key corresponding to the old public key in order for the exchange to occur.

Properties

It can be shown that the above-described illustrative embodiment of the invention provides entitlement authentication, i.e., allows a party examining an offer to determine that the party making the offer has been issued the rights to the subject of the offer. Any party considering an offer $\Omega$ issued by Alice is able to determine from the X-cash coin $\Omega$ whether Alice has been issued the goods, services, or moneys being offered. Moreover, this should be achievable off-line in many applications. Note that this property is different from authentication in the usual sense in that Alice's identity is not of concern, and may not even be known. Note also that entitlement authentication is a guarantee that Alice has been issued, but not necessarily that she currently possesses, the funds or rights in question: these funds or rights may already have been spent. Recall that Alice signs the offer using the key associated with the negotiable certificate C. The public key in C is signed by a financial institution, meaning that this institution is responsible for redeeming the value implicitly specified by the public key and certificate. Thus, by examining the signatures, Bob can ascertain that the certifying entity will redeem this value in the case of a transaction if there are funds remaining.

The illustrative embodiment also provides fairness, i.e., no one is able to engage in an exchange not defined by the corresponding offer and bid. First, a bid is made with respect to an offer in a binding way: a matching offer constitutes a pair of offer and bid. For example, in the illustrative embodiment, Bob signs both offer and bid together, so that they may not be dissociated without forgery or alteration of his signature. Likewise, Alice protects the integrity of the offer by signing it. Therefore, the illustrative embodiment provides fairness under the assumption that the financial entities will not steal resources. Moreover, Alice is able to specify, in her X-cash coin, how many such exchanges she wishes to engage in.

The illustrative embodiment also provides so-called "perfect matchmaking." In other words, any party with a strategy for producing valid bids and appropriate access to broadcasts or other transmission of an offer $\Omega$ should be allowed a fair exchange based on $\Omega$. No information beyond publicly available information and that provided by $\Omega$ is required. It is assumed in the illustrative embodiment that there is a mechanism for selection of offers and bids in place, and for simplicity, that this mechanism effects perfect matches. Based on the above-noted assumptions regarding the network, it is not possible for an adversary to impede the broadcast of an X-cash coin $\Omega$ significantly. In particular, any party which has access to a distribution point $D \epsilon D$ such that $p_t(D)$ is significantly large for suitable t will obtain $\Omega$ with high probability even in the face of an adversarial attack. Also based on the above-noted assumptions about the network, bids will arrive at the appropriate financial institution unimpeded. Having collected bids in accordance with the policy P specified in $\Omega$, the financial institution backing the offer will process all matching bids. Selected offers and bids will then be resolved by the financial institutions backing the funds of the offer and the selected bids. By the above-noted fairness property, the resulting trade will be fair.

It can also be shown that the illustrative embodiment provides integrity, i.e., any party is able to verify that a given X-cash coin or bid capsule has not been tampered with. This follows from the use of digital signatures to authenticate offers. It should be noted that if it is possible to tamper with an X-cash coin or bid capsule, this breaks the assumption that the corresponding signature scheme is unforgeable.

Extensions

There are many possible ways of extending the functionality of the above-described illustrative embodiment. For example, it will be apparent to those of ordinary skill in the art that the invention can be implemented so as to provide anonymity. The ability to perform financial transactions anonymously has been of major concern to proponents of digital cash since its inception. Anonymity is of equal or greater importance in X-cash transactions, particularly as a single coin may be viewed openly by many parties. X-cash may be rendered anonymous by essentially the same techniques as are used with conventional electronic cash. For example, techniques with perfect privacy and on-line redemption, e.g., those described in D. Chaum, "Blind Signatures for Untraceable Payments," Advances in Cryptology—Proceedings of Crypto '82, pp. 199–203, which is incorporated by reference herein, are quite suitable for use with X-cash, as are many of the schemes with anonymity controlled by trustees. It should be noted that the techniques with perfect privacy and on-line redemption can require putting additional trust in the financial institution, since the institution can determine the secret key of an X-cash coin from multiple attempts to spend that coin. This is a problem which is generally not present in the trustee-based schemes.

The illustrative embodiment described above considers only stateless offers, i.e., offers $\omega$ which take as input a single bid. In some situations, though, the party making an offer may wish to take into account the value of multiple bids or other information simultaneously. For this reason, it will often be desirable to extend the scope of the offer program $\omega$ to allow for a range of possible inputs and outputs, and also to change the policy field P. The following are a number of examples of such an extension to stateful offers.

1. Alice has 50,000 frequent flier miles to sell. She is willing to sell them piecemeal, but wishes to dispose of as many as possible in the next month. Alice therefore indicates in her policy P that the financial institution should collect all bids $Q_1, Q_2, \ldots, Q_n$ over the next month and then run $\omega$ on them, processing all bids output by $\omega$. Alice therefore constructs an offer program $\omega$ which finds and outputs the subset of bids among $Q_1, Q_2, \ldots, Q_n$ whose sum is as close as possible to but not greater than 50,000.

2. Alice wishes to sell a 6 ounce gold bar for its market price on the day of sale. She obtains from her financial institution a negotiable certificate of entitlement to the gold and constructs an offer program $\omega$. When given a bid Q, the program $\omega$ goes out onto the Web, checks the current price per ounce d of gold bullion, and outputs "yes" if $Q \geq 6d$, and "no" otherwise. Alice indicates in P that her financial institution should redeem any bid Q which yields a "yes" output. Note that the state in $\omega$ is external in this example.

While the added level of functionality provided by stateful offers greatly extends the range of trades Alice may perform, it may open Bob up to a "bait-and-switch" attack. As noted previously, this attack involves the construction of an offer program which appears to offer one type of exchange, but in reality offers another exchange much less profitable to a party making a bid. For example, Alice may offer on the $10^{th}$ of October to sell frequent flier miles at the rate of 100 miles/$1. She constructs a program $\omega$ which takes as input a bid of $Q and outputs "100Q frequent flier miles" provided that it is still the $10^{th}$ of October. In fact, Alice's program checks the system date, and on any date past the $10^{th}$ of October, outputs "2 frequent flier miles." Bob receives on the $10^{th}$ of October what looks from the outside like a stateless offer program $\omega$. If he submits an offer of $10 on the next day without checking the program output again, he will be cheated and end up with only 2 frequent flier miles.

As previously noted, rather than having Bob reverse-engineer Alice's program $\omega$, this potential "bait-and-switch" problem may be avoided by having Bob specify in his bid what goods he expects to receive from Alice. In the example of the frequent flier miles, for instance, Bob indicates with his bid of $10 that he expects to receive 1000 frequent flier miles. In general, Bob may add an extra field Z to the signature in his bid capsule. Thus the corresponding signature in his bid capsule R would assume the form $\sigma_{SKB}(\Omega, Q, Z)$, where Z is a description of the goods he expects to receive from Alice. As noted above, a financial institution only redeems an X-cash coin if offer and bid match.

The extensions given above illustrate how it is possible to enhance the offer program to make X-cash more flexible. It is also possible to make enhancements to the policy P. This may be particularly useful if, e.g., Alice wishes to pursue what we refer to as a "secret strategy," i.e., if she wishes for her method for selecting among bids to remain concealed from potential trading partners. She may be accomplish this by constructing an X-cash coin of the form $\Omega = \sigma_{SKA}(\omega, E_{PKF}[P], C)$, where $PK_F$ is the public key of Alice's issuing financial institution. Consider the following scenario. Alice wishes to sell one million shares of XYZ Corp., a controlling interest, at the price of $100/share. She does not want anyone to know how large a block of stock is being sold, and wants to avoid having any one individual accumulate too many shares from the offering. Alice may accomplish this by constructing an offer program w) which takes as input a bid Q and outputs "$Q/100 shares." She constructs a policy P stating that any bid for more than 10,000 shares should be rejected. Alice includes an encryption of P, e.g., $E_{PKF}[P]$, in her X-cash coin as described above. Note that if complex policy statements are permitted, then it may be beneficial for P to take the form of a program whose inputs are bids and timestamps associated with these bids and whose outputs are accepted bids.

An X-cash coin in accordance with the invention may also be used to convert a given type of credential to any other type of credential, potentially without reference to a financial or other mediating institution. For example, Alice may be the European Union (EU) passport office. She creates a program ω that takes as input a digital representation of any passport from an EU member country, verifies its validity, and outputs an EU passport for the corresponding individual. Alice obtains a certificate from the EU home office and uses the corresponding secret key to sign M, thereby creating an X-cash coin Ω. The X-cash coin Ω can now be used to convert, e.g., an English passport to an EU passport. The legitimacy of the digital signature on Ω confers legitimacy to the EU passport.

Another possible alternative embodiment involves the user Bob talking a piece of X-cash and an item Q to Alice's financial institution. By executing the offer program ω on Q, Alice's financial institution can then determine how much to pay Bob, without Bob ever executing the program ω himself. Alice's financial institution may then hold the item Q for Alice or otherwise arrange to send it to her. As in the illustrative embodiment described in conjunction with FIGS. 2 through 5, the trade in this alternative embodiment is completed in a secure fashion without any direct contact between Alice and Bob. These and numerous other alternative embodiments within the scope of the following claims will be apparent to those skilled in the art.

What is claimed is:

1. A method comprising the steps of:
generating a piece of digital cash representing an offer made by a first user, the piece of digital cash including: (i) a digital certificate, and (ii) an offer program characterizing the offer, the offer program specifying for a given input a particular transfer to be made by the first user and authorized by the digital certificate; and
transmitting the piece of digital cash, whereby a second user can evaluate the offer by supplying a bid as input to the offer program, and if the bid is indicated as acceptable by the offer program the second user can bind the first user to make the corresponding transfer authorized by the digital certificate.

2. The method of claim 1 wherein the offer program takes as an input information regarding an item and outputs information regarding what the first user is willing to give for the item as part of the offer.

3. The method of claim 1 further including the step of executing the offer program via an institution associated with the first user to determine what the second user would receive upon acceptance of the offer.

4. The method of claim 1 further including the step of the second user executing the offer program to determine what the second user would receive upon acceptance of the offer.

5. The method of claim 1 wherein the transmitting step includes transmitting the piece of digital cash utilizing at least one of a mobile agent, an e-mail message, or an on-line bulletin board.

6. The method of claim 1 wherein the piece of digital cash further includes additional information specifying a policy for processing multiple bids received in response to the offer.

7. The method of claim 6 wherein the transmitting step includes broadcasting the piece of digital cash from the first user to a plurality of other users including the second user, and wherein an institution associated with the first user: (i) utilizes the offer program to determine what the first user would receive upon acceptance of each of a plurality of bids received from the other users; and (ii) utilizes the additional information specifying the policy for processing multiple bids to select one of the bids on behalf of the first user.

8. The method of claim 1 wherein the digital certificate is generated on a public key associated with the first user and authorizes the first user to make transfers using a corresponding secret key.

9. The method of claim 8 wherein the piece of digital cash further includes a digital signature on the offer program signed using the secret key associated with the digital certificate.

10. An apparatus comprising:
a processor operative to generate a piece of digital cash representing an offer made by a first user, the piece of digital cash including: (i) a digital certificate, and (ii) an offer program characterizing the offer, the offer program specifying for a given input a particular transfer to be made by the first user and authorized by the digital certificate, whereby a second user receiving the piece of digital cash can evaluate the offer by supplying a bid as input to the offer program, and if the bid is indicated as acceptable by the offer program the second user can bind the first user to make the corresponding transfer authorized by the digital certificate; and
a memory coupled to the processor for at least temporarily storing at least a portion of the piece of digital cash.

11. The apparatus of claim 10 wherein the offer program takes as an input information regarding an item and outputs information regarding what the first user is willing to give for the item as part of the offer.

12. The apparatus of claim 10 wherein the digital certificate is generated on a public key associated with the first user and authorizes the first user to make transfers using a corresponding secret key.

13. The apparatus of claim 12 wherein the piece of digital cash further includes a digital signature on the offer program signed using the secret key associated with the digital certificate.

14. A computer-readable medium containing one or more programs, wherein the one or more programs when executed in a computer provide the steps of:
generating a piece of digital cash representing an offer made by a first user, the piece of digital cash including: (i) a digital certificate, and (ii) an offer program characterizing the offer, the offer program specifying for a given input a particular transfer to be made by the first user and authorized by the digital certificate; and
transmitting the piece of digital cash, whereby a second user can evaluate the offer by supplying a bid as input to the offer program, and if the bid is indicated as acceptable by the offer program the second user can bind the first user to make the corresponding transfer authorized by the digital certificate.

15. The computer-readable medium of claim 14 wherein the piece of digital cash further includes a digital signature on the offer program signed using a secret key associated with the digital certificate.

16. A method comprising the steps of:
receiving a piece of digital cash representing an offer made by a first user, the piece of digital cash including: (i) a digital certificate, and (ii) an offer program characterizing the offer, the offer program specifying for a given input a particular transfer to be made by the first user and authorized by the digital certificate; and
evaluating the offer by supplying a bid as input to the offer program, and if the bid is indicated as acceptable by the offer program the second user can bind he first user to make the corresponding transfer authorized by the digital certificate.

17. The method of claim 16 wherein the offer program takes as an input information regarding an item and outputs information regarding what the first user is willing to give for the item as part of the offer.

18. The method of claim 16 wherein the evaluating step further includes the step of executing the offer program via an institution associated with the first user to determine what a second user would receive upon acceptance of the offer.

19. The method of claim 16 wherein the evaluating step further includes the step of a second user executing the offer program to determine what the second user would receive upon acceptance of the offer.

20. The method of claim 16 wherein the evaluating step further includes the step of a second user processing a textual description associated with the offer program.

21. The method of claim 16 wherein the digital certificate is generated on a public key associated with the first user and authorizes the first user to make transfers using a corresponding secret key.

22. The method of claim 21 wherein the piece of digital cash further includes a digital signature on the offer program signed using the secret key associated with the digital certificate.

23. The method of claim 16 further including the step of a second user submitting a bid to an institution associated with the first user, wherein the second user determines what would be received upon acceptance of the bid by executing the offer program using the bid as an input.

24. The method of claim 23 wherein the bid includes a second digital certificate authorizing the second user to make specified transfers.

25. The method of claim 24 wherein the second digital certificate is generated on a public key associated with the second user and authorizes the second user to make transfers using a corresponding secret key.

26. The method of claim 25 wherein the bid includes a digital signature on the bid signed using the secret key associated with the second digital certificate.

27. The method of claim 23 wherein the bid includes an indication as to what the second user expects to receive from the first user upon acceptance of the bid.

28. A method comprising the steps of:

receiving a piece of digital cash representing an offer made by a user, the piece of digital cash including: (i) a digital certificate, and (ii) an offer program characterizing the offer, the offer program specifying for a given input a particular transfer to be made by the first user and authorized by the digital certificate; and executing the offer by supplying a bid as input to the offer program, wherein if the bid is indicated as acceptable by the offer program the user is bound to the corresponding transfer authorized by the digital certificate.

* * * * *